United States Patent [19]

Minami

[11] Patent Number: 4,703,636
[45] Date of Patent: Nov. 3, 1987

[54] CENTER LOCKING DEVICE OF THE INTERMEDIARY PLATE TYPE FOR A DISC WHEEL OF MOTOR VEHICLE

[75] Inventor: Saburo Minami, Osaka, Japan
[73] Assignee: Speed Star Co., Ltd., Osaka, Japan
[21] Appl. No.: 751,010
[22] Filed: Jul. 2, 1985
[51] Int. Cl.⁴ .................. F16B 41/00; E05B 47/00
[52] U.S. Cl. .......................... 70/223; 70/276; 70/231; 70/165
[58] Field of Search ........... 70/276, 158, 223, 232, 70/231, 165, 223, 363

[56] References Cited

U.S. PATENT DOCUMENTS

| | | | |
|---|---|---|---|
| 592,070 | 10/1897 | Turner | 292/140 |
| 1,580,527 | 4/1926 | Parmele | 70/231 |
| 1,870,427 | 8/1932 | Stallings et al. | 70/231 |
| 1,886,013 | 11/1932 | Harris | 70/172 |
| 1,997,113 | 4/1935 | Lewis | 70/165 |
| 2,070,692 | 2/1937 | Stone | 70/165 |
| 2,109,684 | 3/1938 | Short | 301/37 AT |
| 2,919,739 | 1/1960 | Vocke | 70/231 |
| 3,236,076 | 2/1966 | Wellekens | 70/168 |
| 3,352,133 | 11/1967 | Selleck | 301/37 AT |
| 3,376,615 | 4/1968 | Heckman | 70/276 |
| 3,967,479 | 7/1976 | Vick | 70/276 |
| 3,978,698 | 9/1976 | Ono | 70/276 |
| 4,000,633 | 1/1977 | Evans | 70/165 |
| 4,022,038 | 5/1977 | Miller | 70/276 |
| 4,133,194 | 1/1979 | Sedley et al. | 70/276 |
| 4,336,698 | 6/1982 | Hurd | 70/165 |

FOREIGN PATENT DOCUMENTS

| | | | |
|---|---|---|---|
| 2828104 | 1/1980 | Fed. Rep. of Germany | 301/37 AT |
| 1190429 | 10/1959 | France | 70/169 |
| 2050963 | 1/1981 | United Kingdom | 301/37 AT |

Primary Examiner—Gary L. Smith
Assistant Examiner—Vinh Luong
Attorney, Agent, or Firm—Wenderoth, Lind & Ponack

[57] ABSTRACT

A center locking device of intermediary plate type for a disc wheel of motor vehicle. The device has a cap nut screwed onto a threaded section of a flange fixed to the axle of the disc wheel. The disc wheel is clamped between the cap nut and the flange. A locking device is provided to lock the cap nut to the threaded section of the flange for preventing the disc wheel from becoming loose and/or theft of the disc wheel.

2 Claims, 7 Drawing Figures

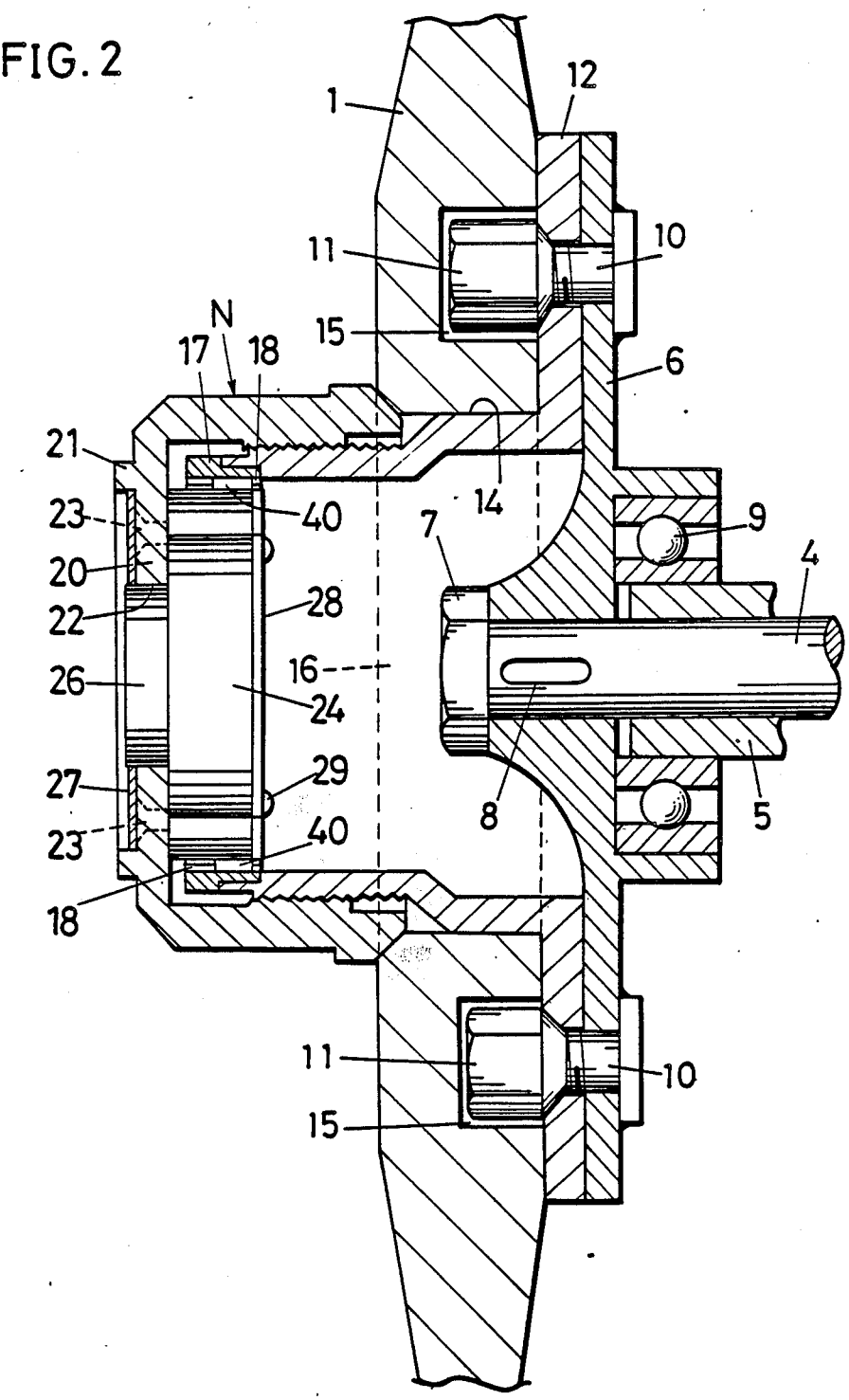

CENTER LOCKING DEVICE OF THE INTERMEDIARY PLATE TYPE FOR A DISC WHEEL OF MOTOR VEHICLE

BACKGROUND OF THE INVENTION

1. Field of the Invention:

This invention relates to a center locking device of the intermediary plate type for both locking and burglarproofing purposes to be provided inside a cap nut for a disc wheel of motor vehicle.

2. Prior Art:

In the conventional disc wheel for a motor vehicle, a flange with a threaded tube is fastened to a hub of an axle. A center hole of a disc is fitted on the threaded tube. A cap nut is screwed on the tube and thus the disc is fastened to the axle. As the disc is generally made of aluminum and has no clamp nut at a boss, it provides for a good appearance. However, since it has no center locking means, the cap nut is liable to become loose when a driver applies the brakes sharply. Also, since there is no locking device for the cap nut, the cap nut can be removed easily and accordingly disc wheels are apt to be stolen.

SUMMARY OF THE INVENTION

The present invention has for its object to eliminate such disadvantages of the conventional disc wheels for a motor vehicle as stated above. It provides a locking device of the intermediary plate type inside a cap nut in order to prevent disc wheels from loosening and from being stolen.

BRIEF EXPLANATION OF THE DRAWINGS

The nature and advantages of the present invention will be understood more clearly from the following description made with reference to the accompanying drawings, in which:

FIG. 2 is a cross sectional view of a central part of the disc wheel;

DETAILED EXPLANATION OF THE INVENTION

Figure 1:
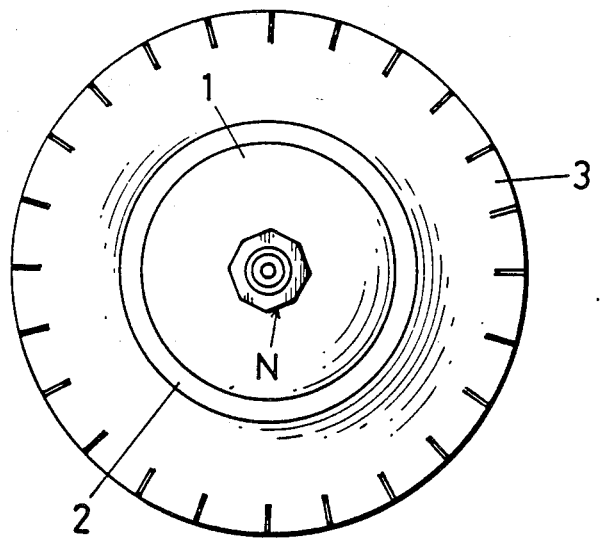
FIG. 1 is a front view of a disc wheel.

In FIG. 1 and FIG. 2, numeral 1 denotes an aluminum disc. A tire 3 is mounted on a rim 2 fitted to the circumferential edge of the disc 1, which is connected to an axle 4 by only a cap nut N. The axle 4 is surrounded by a tubular housing 5. A boss of a hub 6 is fitted on an end of the axle 4 and both are connected together by a bolt 7 and a key 8. One end of the housing 5 is inserted in a recess inside the boss and ball bearings 9 are interposed therebetween. The hub 6 is supported to the end of the housing 5 by these ball bearings 9. Four clamping bolts 10, welded to the inner surface of the hub 6, project from the outside surface. Numeral 12 designates an annular flange integral with a threaded tube 13. Each clamping bolt 10 extends through each of four holes of the annular flange 12, which is fastened to the hub 6 integrally by a clamp nut 11. The threaded tube 13 has a left-handed thread at its outer circumferential surface but is made slightly thicker and is unthreaded at its base part 14. Since the disc 1 is made of aluminum, it is made thicker at its boss part to improve its strength. Four recesses 15 are provided on the inner side of the disc at uniformly spaced circumferential positions corresponding to the positions of the bolts 10.

A center hole 16 of the disc 2 is fitted on the unthreaded part 14 of the tube 13 and the inner side of the boss is fastened tightly against the flange 12. The clamp nut 11 is inserted in the recess 15 for locking the disc 1. The cap nut N is screwed counterclockwise to the tube 13 to press the tapered surface of its end against the tapered surface of the center hole 16. The boss of the disc 1 is fastened tight against the flange 12 connected to the hub 6 of the axle 4 by the cap nut N so that the disc 1 is connected to the axle 4. As the threaded tube 13 has a left-handed thread and the cap nut N is threaded onto the former, the cap nut N is locked relative to a clockwise rotational direction of the wheel. It is also practicable that the tube 13 has a right-handed thread and the cap nut N is threaded clockwise.

The present invention incorporates a center locking device of intermediary plate type for locking and burglarproofing purposes in the cap nut of the disc wheel.

In embodiments shown in FIG. 2–FIG. 5, numeral 17 denotes an inner gear ring provide along its inner periphery with saw-tooth like pawls 18. The inner gear ring 17 is fixed to the top end of the tube 13 by inserting three projections 19 at its outer edge into cuts in the screwed tube 13 and by caulking the cuts. It is possible to form the inner gear ring 17 by making an annular thicker part at the inner peripheral surface at the outer end of the screwed tube 13 and forming the thicker part into the inner gear ring 17 by processing it by a broaching machine.

The cap nut N is of octagonal shape. An annular member 21 protrudes from the circumferential rim of an end plate 20. A hole 22 is provided at the center of the end plate 20. Four countersinks are made around the hole 22. Numeral 24 is a locking device proper to be incorporated in the cap nut N. It is thick and rectangular and has a hole 25 at its center, with its two shorter ends being arcuate. An annular member 26 protrudes at the central part of the locking device proper 24 and is fitted in the hole 22 of the end plate 20. Four short protrusions 23 on the front of the locking device proper 24 are put in corresponding countersinks of the end plate 20 and the outer ends of the short protrusions 23 are caulked, whereby the locking device proper 24 is fixed to the inner surface of the end plate 20 of the cap nut N. Numeral 27 designates a seal plate connected to the end plate 20 and has at its center a round hole in which the annular member 26 of the locking device proper 24 is inserted. It is received in the inside of the annular member 26 of the end plate 20 and is fixed with an adhesive to the front surface of the end plate 20 to make the cap nut N better in appearance.

A recess 30 of substantially hexagonal shape is made at the back surface of the locking device proper 24. The whole back surface of the locking device proper 24 is covered with a back lid 28 which is fixed by four screws 29. A split groove 31 is made at each of the upper and the lower portions of the back surface. This groove 31 is aligned with one of the oblique sides of the recess 30 and extends to the edge of the locking device proper 24.

A recess defining a guide groove 32 having a round portion 33 at its outer end and is made alongside the split groove 31 and the oblique side of the recess 30. Numeral 34 is an oval cam with a circular flange 35. This cam is received in the central part of the recess 30, with its flange 35 fitted in a round depression of the recess 30. A square-shaped top end of a mandrel 57 projecting from the back surface of the key disc (to be explained later) is fitted in a square-shaped central hole of the cam 34 and is caulked. A projection provided at the flange 35 (not shown in the drawing) is fitted in a fan-shaped groove (not shown in the drawing) made in the round depression for limiting rotation of the cam 34 to an angle of about 90°.

Numeral 40 is a slightly curved leaf spring member with small projections 41 on both sides. This spring member 40 is received in the split groove 31 and an end portion of the recess 30, with its concave side facing the shallow recess 32 and its small projections 41 loosely fitted in a small square hole 42 at the innermost end of the recess 32 and a cut (not shown in the drawing) of the back lid 28 so that the leaf spring member 40 can slide in the split groove 31 with the two projections 41 acting as fulcrums. A push spring 43 received in a recess at the central part of the recess 32 presses against the concave side of the leaf spring member 40. Numeral 44 is an intermediary plate received in the upper part and in the lower part of the recess 30. This intermediary plate 44 is substantially fan-shaped and has a protruding piece 45 and a support axis 46 which is slidably fitted in a round hole made in the back lid 28. A push spring 47 received in a recess at the oblique side of the recess 30 presses against one side of the intermediary plate 44, whereby the protruding piece 45 is forced to be in contact with the cam 34 and an arcuate side 48 is forced to be in contact with the leaf spring member 40.

Under the above arrangement, when the major axis of the oval cam 34 pushes the protruding piece 45 of the intermediary plate 44, an arcuate end 48 of the intermediary plate 44 presses the central part of the leaf spring member 40, whereupon a top end of the leaf spring member 40 projects from the edge of the locking device proper 24 and engages the pawl 18 of the inner gear ring. By this engagement, revolution of the cap nut N is checked. When the cam 34 turns about 90° and its major axis faces is turned away from the protruding piece 45, the intermediary plate 44 is pushed by the push spring 47 and is turned, moving its arcuate side 48 from the central part of the leaf spring member 40 toward the support axis side 46. As a result, the leaf spring member 40 is pushed back by the push spring 43 and its top end disengages from the pawl 18 of the inner gear ring. Thus, the cap nut N may now rotate. Since the leaf spring member 40 is flexible, when its top end engages with the pawl 18 of the inner gear ring, there is no danger of the leaf spring member 40 being broken.

An embodiment of a magnet lock L to be used for the device according to the present invention is explained below.

Figure 3:
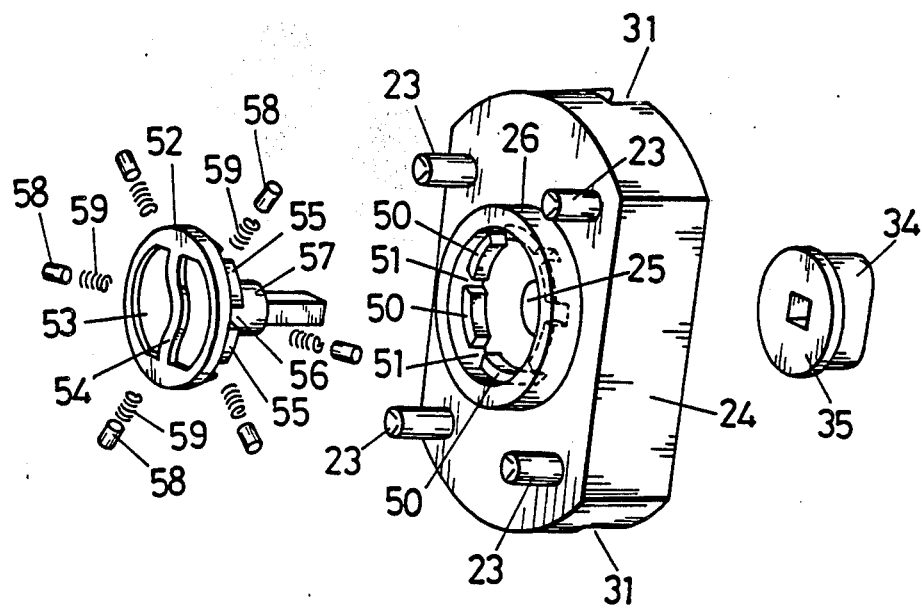
FIG. 3 is an exploded perspective view of parts of the locking device.
Figure 4:
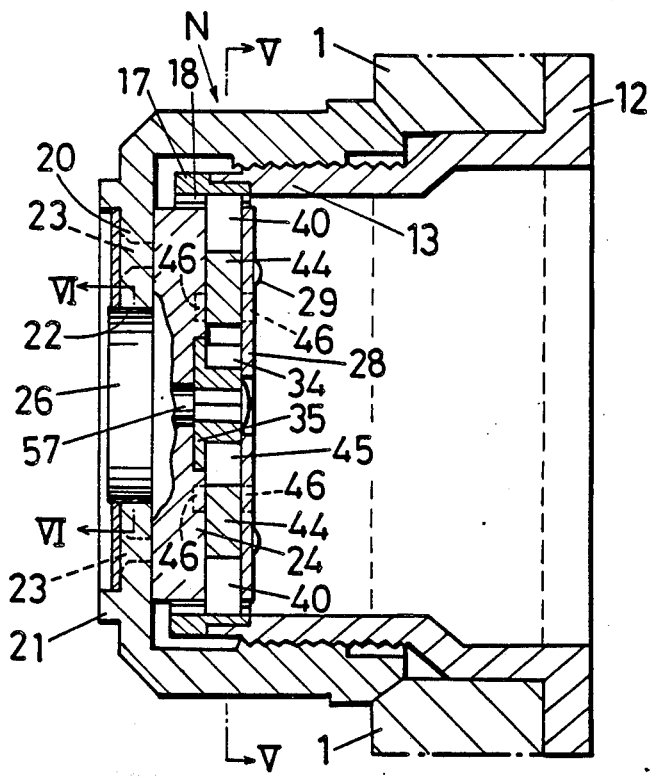
FIG. 4 is a cross sectional view of a cap nut portion, on an enlarged scale.
Figure 5:
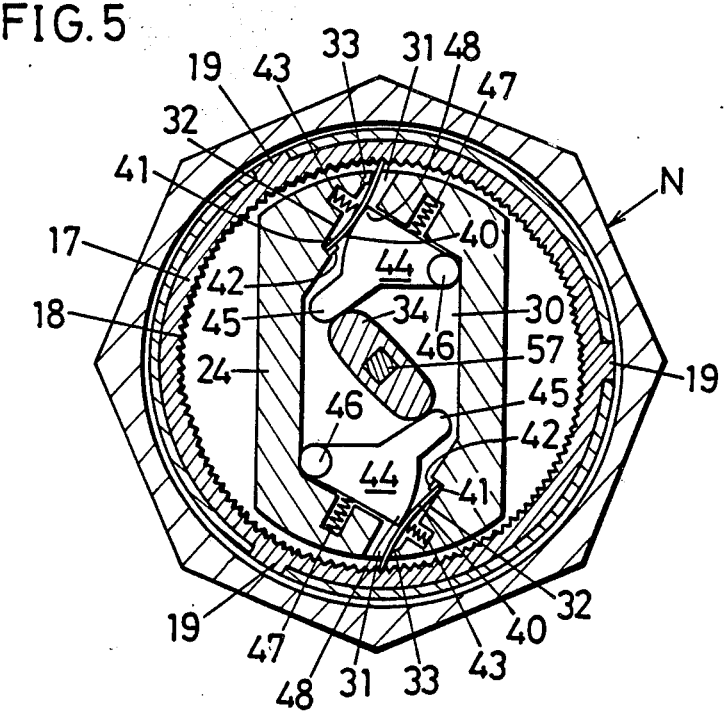
FIG. 5 is a sectional view of the cap nut portion, taken along the line V—V in FIG. 4.
Figure 6:
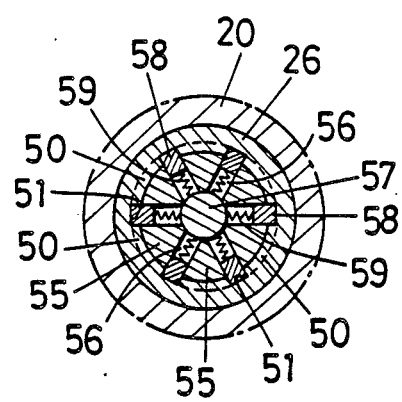
FIG. 6 is a sectional view of the cap nut portion, taken along the line VI—VI in FIG. 4.

As shown in FIGS. 3, 4 and 6, along the inner circumferential surface of the annular member 26 of the locking device proper 24, a protrusion 50 (about half as high as the annular member 26) is provided. This protrusion 50 is divided into six parts so as to make six recesses 51 spaced equally apart from one another at an angle of 60°. Numeral 52 is a key disc to be put in the annular member 26 and has at its front surface a shallow depression 53 and a projection 54 extending vertically and at its back surface side triangular projections 55 equally spaced from one another. These projections 55 are fitted inside the protrusion 50 of the annular member 26. The key disc 52 has six radiant grooves 56 (each provided between the projections 55) which extend in radial direction and are spaced apart from one another at an angle of 60°. The width of this groove 56 substantially corresponds to the width of the recess 51.

A mandrel 57 which projects from the back surface of the key disc 52 is put through the center hole 25 of the locking device proper 24 and the key disc 52 is prevented from falling off by the cam 34 fixed to the cut square end of the mandrel 57, and is rotatable relative to the end plate 20 of the cap nut N. Numeral 58 designates short magnets having a round rod shape. Six magnets 58 are inserted, together with springs 59, in the six radiant grooves 56 and accordingly are arranged 60° apart from one another. A magnetic lock L composed by the magnets 58, springs 59 and the key disc 52 is set in the locking device proper 24 which is fitted to the inner surface of the end plate 20 of the cap nut N. The magnet 58 is always pushed by the spring 59 and projects its outer end into the recesses 51 provided in the annular member 26. The magnet connects the key disc 52 to the locking device proper 24, thus fixing the revolution of the key disc 52 and presenting the locked state. By changing the number of magnets and by changing the directions of N pole and S pole, key variations can be obtained.

Figure 7:
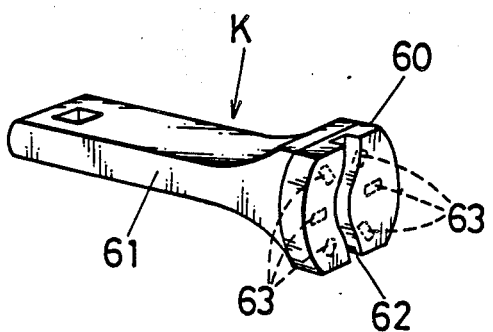
FIG. 7 is a perspective view of a key.

As shown in FIG. 7, the key K comprises a main piece 60 and a grip 61. The main piece 60 is shaped so as to be fitted in the recess 53 of the key disc 52. A groove 62 in vertical direction which corresponds to the projection 54 of the key disc 52 is provided in the front of the main piece 60 and the position at which the key is used is controlled by the curve of the projection 54 and the groove 62. Six small magnets 63 of round rod shape are embedded in the main piece 60 in a radial direction. These magnets 63 are arranged in such a fashion that they oppose the isomeric magnetic poles of the magnetic 58 in the key disc and are shifted toward the center by a distance corresponding to the recess 51, in relation to the magnets 58 in the key disc.

When the main piece 60 of the key K is fitted in the recess 53 of the key disc to engage the groove 62 with the projection 54, the magnets 58 in the key disc are attracted by the magnets 63 of the key K and shift toward the center side of the key disc against the force of the springs 59, sliding from the recesses 51 in the annular member 26. Thus, the key disc 52 is now rotatable. Since this key disc 52 revolves with the magnets 58 it is not necessary to limit the rotation of the key disc within the space between magnets as is the case in the conventional magnet lock, in other words, the key disc can be rotated as much as is desired.

An embodiment of the present invention is comprised of as mentioned above, namely, the annular flange 12 having the threaded tube 13 fastened to the hub 6 of the axle 4; the center hole 16 of the disc fitted in the unthreaded part 14 of the tube to make the inside surface of the boss contact tightly against the flange 12; the clamp nut 11 put in the recess 15 to check the revolution of the disc; the cap nut N screwed to the tube 13 to press the tapered surface of its inner end against the tapered surface of the center hole 16 of the disc, thereby fastening the boss of the disc tightly against the flange 12 and the cap nut N and consequently connecting the disc wheel 1 to the axle 4.

When the cap nut N is fitted or removed, a minor axis of the cam 34 in the locking device proper 24 is positioned to face the protruding piece 45, whereupon the push spring 43 pushes back the leaf spring member 40 and the top end of the leaf spring member is disengaged from the pawls of the inner gear ring 17. Thus, the cap nut N is free to rotate.

When the fastening of the disc is finished, the main piece 60 of the key K is fitted in the recess 53 of the key disc to engage the groove 62 with the projection 54, whereupon the magnets 58 in the key disc 52 are shifted toward the central part and the key disc 52 is free to rotate. When the key is turned 90°, the key disc 52 and it mandrel 57 are also turned about 90°. Thus, the mandrel 57 turns the cam 34 by about 90°, whereupon the major axis of the cam 34 pushes the protruding piece 45 of the intermediary plate 44, the arcuate side 48 of the intermediary plate 44 pushes the central part of the leaf spring member 40 and projects the top end of the leaf spring member 40 from the locking device proper 24 and engages it with the pawl 18 of the inner gear ring. If the key K is taken off, the magnets 58 in the key disc are pushed by the springs 59 into the recesses 51 of the annular member 26 and therefore rotation of the key disc 52 is fixed and the magnet lock L is put in a locked state, with the result that engagement of the leaf spring member 40 with the inner gear ring 17 is ensured. As a result, the revolution of the cap nut N is checked and therefore the cap nut N is checked and therefore the cap nut N which has been screwed to the threaded tube 13 and has fastened the disc 1 is prevented from loosening during running of a motor vehicle and is also free from being removed unfairly for stealing a disc wheel.

In cases where a disc wheel is changed, the main piece 60 of the key K is fitted in the concave 53, whereby the magnets 63 in the key disc are attracted by the magnets 58 of the key K and the magnets 63 are pulled from the recesses 51 in the annular member 26 to make the key disc 52 rotatable. Then, if the key K is turned by about 90°, the key disc 52 and its mandrel 57 are also turned about 90°, whereupon the mandrel 57 turns the cam 34 by about 90° and makes its minor axis face the protruding piece 45 of the intermediary plate 44, whereupon the intermediary plate 44 moves by being pushed by the push spring 47 and shifts its arcuate side 48 from the central part of the leaf spring member 40 toward the support axis 45 side. Thus, the leaf spring member 40 is pushed back by the push spring 43 and its top end is disengaged from the pawl 18 of the inner gear ring. In this state, if the key K is taken off, magnets 58 in the key disc 52 contact the protrusions 50 and the magnet lock L is maintained in an unlocked state. Therefore, the cam 34 is maintained in the state that its minor axis is in contact with the protruding piece 45 of the intermediary plate 44 and even if the key K is taken off, the leaf spring member 40 is maintained so that its top end is disengaged from the pawl 18 of the inner gear ring. Then, the cap nut N is taken off the threaded tube 13 by a spanner, the disc 1 is pulled off the unthreaded part 14 of the tube 13 and the disc wheel is exchanged. When the disc wheel is exchanged and the cap nut N is screwed again to the threaded tube 13, the magnet lock L is kept in an unlocked state so that the cap nut N is easy to turn. After the cap nut N is screwed in fully by hand, the key K can turn the key disc 52 by about 90°, whereby the magnet lock L is locked and the major axis of the cam 34 pushes the protruding piece 45 of the intermediary plate 44. As a result, the leaf spring member 40 projects from the locking device proper 24 and engages the pawl 18 of the inner gear ring. Thus, the rotation of the cap nut N is checked.

The foregoing is an explanation of one embodiment of the present invention. However, this invention is not limited to this embodiment but can be changed in design within the range of the gist of the present invention, for example, the present invention can be applied to an ordinary steel disc. It is also possible to shape the locking device proper 24 square, for example, with two sides made arcuate and to increase the number of leaf spring members 40 and the number of the intermediary plates 44. The magnet lock can be substituted by a cylinder lock and it is also possible to increase or decrease the number of magnets of the magnet lock or to use magnets of a rectangular parallelepiped shape having round corners.

According to the present invention, in the disc wheel of motor vehicle wherein the disc is connected to the axle only by a cap nut, an inner gear ring is provided at the end of a threaded tube to which a cap nut is screwed, a locking device proper in which a magnet lock or a cylinder lock is incorporated is fitted to the end plate of the cap nut, a recess and a split groove which extends between the recess and the edge of the locking device proper are provided at the back surface of the locking device proper, a leaf spring member which is always pushed by a push spring is slidably provided from the split groove to the end of the recess, an intermediary plate having a protruding piece is pivotally secured to the recess and a push spring which forces the protruding piece to make contact with a cam is provided and the top end of leaf spring member is engaged with the inner gear ring by the major axis of the cam through the intermediary plate. Under this arrangement, loosening of the cap nut can be prevented, fastening of the disc can be ensured, and the loosening of the disc wheel of a motor vehicle and theft of it can be prevented.

I claim:

1. A center locking device in combination with a disc wheel which is connected to an axle by a flange with a threaded tube thereon and a cap nut having an end plate overlying an end of the threaded tube, comprising:

an inner gear ring having pawls on its inner peripheral surface and integral with the end of the threaded tube;

a locking member mounted on the inner surface of the end plate of the cap nut, said locking member having arcuate peripheral portions corresponding to the shape of the inner gear ring, said locking member having a central recess therein and guide grooves extending from said central recess towards the periphery thereof and a split groove at the outer end of each of the guide grooves and open at one end to said corresponding arcuate peripheral portion of the locking member;

a cam rotatably positioned in said central recess and having a major longitudinal axis and a minor axis transverse to and smaller in length than said major longitudinal axis;

a pivotal intermediary plate means having a protruding piece for cooperating with said cam means, an arcuate section adjacent said split groove and a pivot opposite said arcuate portion for pivoting said intermediary plate means outwardly towards and inwardly from said arcuate peripheral portions;

an intermediary spring means for urging said protruding piece towards said cam means;

a leaf spring member positioned in each said split groove and a push spring engaged with each said leaf spring for urging each said leaf spring from a first position in which one end of the leaf spring projects out of said split groove to engage a pawl on the inner periphery of said ring gear for locking rotation of said cap nut to a second position in which the one end is withdrawn from the pawl for unlocking said cap nut, said cam being rotatable for causing said major longitudinal axis to contact said protruding piece of said intermediary plate means for urging said intermediary plate means outwardly so that the arcuate portion engages said leaf spring to position said leaf spring at said first position, and said cam being rotatable for having the minor longitudinal axis face said intermediary plate means for disengaging the cam from said protruding piece to allow said intermediary plate means to pivot inwardly so that the leaf spring is urged by said push spring to said second position; and locking means having a rotating member connected to said cam for rotating said cam when said locking means is unlocked.

2. A center locking device as claimed in claim 1 wherein said locking means is a magnetic locking means.

* * * * *